2 Sheets—Sheet 1.
J. H. NICHOLS
Harness.
No. 196,035. Patented Oct. 9, 1877.
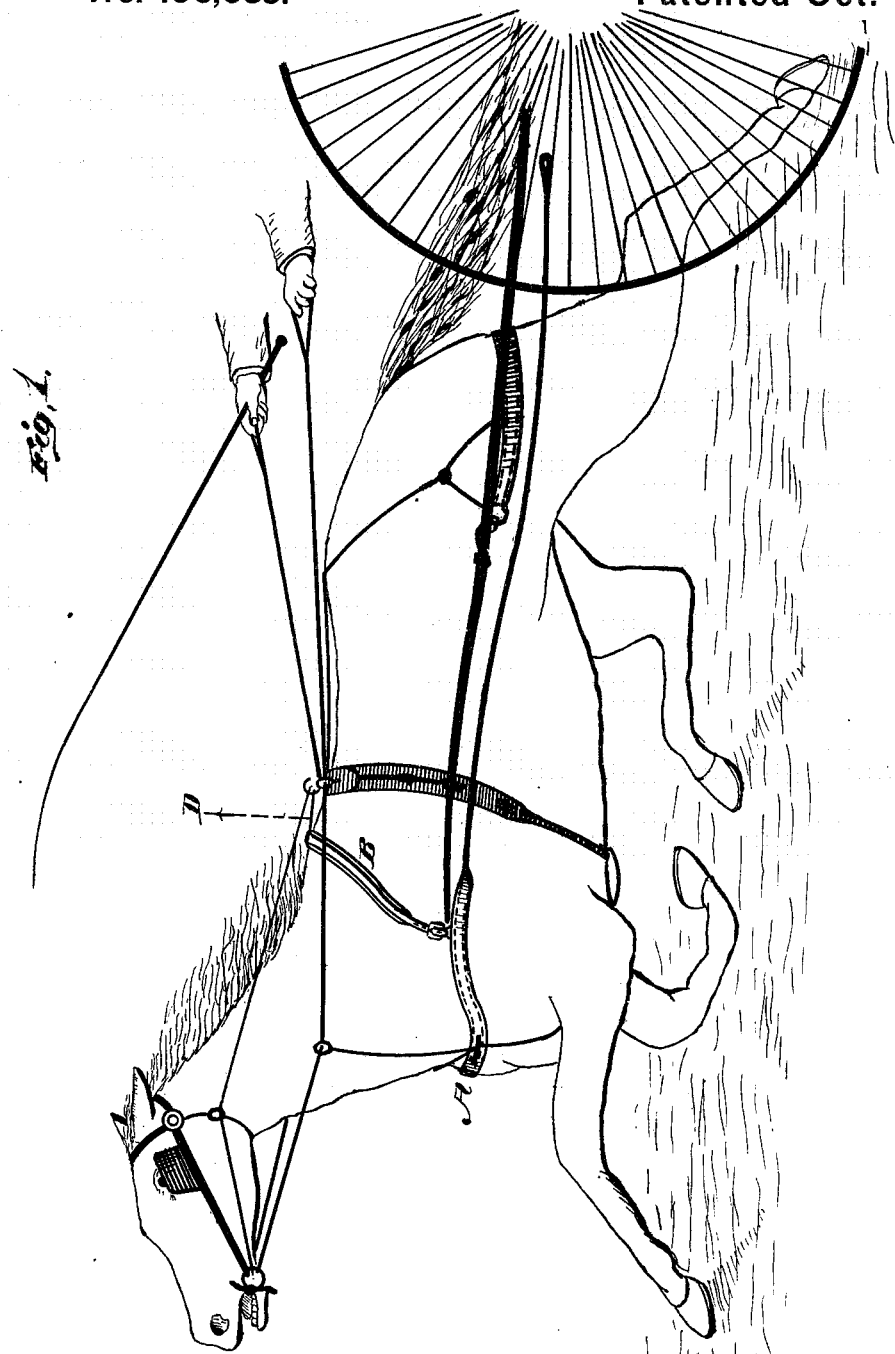
WITNESSES
E. H. Bates
George E. Upham
INVENTOR.
James H. Nichols.
Gilmore Smith & Co.
ATTORNEYS.

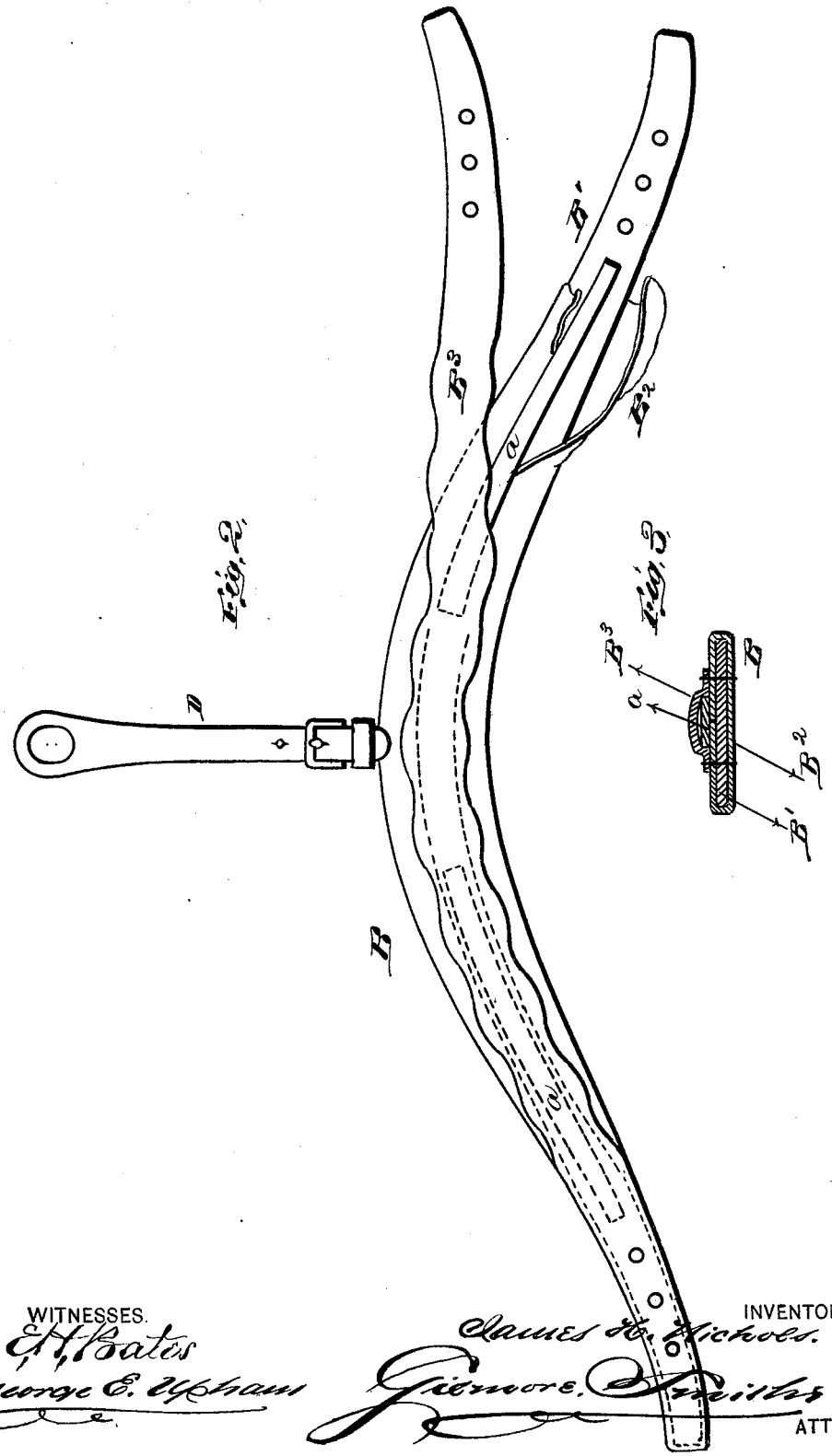

UNITED STATES PATENT OFFICE.

JAMES H. NICHOLS, OF BOSTON, MASSACHUSETTS.

IMPROVEMENT IN HARNESS.

Specification forming part of Letters Patent No. 196,035, dated October 9, 1877; application filed August 7, 1877.

*To all whom it may concern:*

Be it known that I, JAMES H. NICHOLS, of Boston, in the county of Suffolk and State of Massachusetts, have invented a new and valuable Improvement in Harness; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a view of my harness as applied. Fig. 2 is a plan view, and Fig. 3 is a transverse vertical sectional view, thereof.

My invention relates to breast-collar harness; and it consists in a neck-strap cut in a curved form rearwardly, so as to come behind the shoulders and mane, over the back of the horse, as will be hereinafter more fully set forth.

The annexed drawings, to which reference is made, fully illustrate my invention.

A represents the ordinary breast-collar of a breast-collar harness, and B is the strap or band connected to both sides of said collar, and passing over the neck of the horse.

Ordinarily this strap or band is cut straight, and passes over the neck so high up as to wear the mane, and crosses the shoulders, making a strain over the same. This has been attempted to be remedied by connecting the neck-strap with the check-rein hook on the saddle by a short strap; but this has a tendency to turn the neck-strap edgewise, and instead of remedying it increases the evil.

I construct the neck-strap in the following manner: The neck-strap is made in three pieces, $B^1$, $B^2$, and $B^3$. The part $B^1$ is cut with a rearward curve, which is greater or less, according to the build of the horse for which it is made.

The covering $B^2$ is placed under the part $B^1$, and folded over the same on top, when the part $B^3$ is laid over the edges thereof and the whole sewed together, the ends of the parts $B^1$ and $B^3$, also sewed together, projecting beyond the ends of the covering $B^2$, and forming the connections with the breast-collar.

When thus made—that is, when curved rearwardly, as shown—the normal position of the neck-strap is back of the shoulders of the horse, behind the mane, which prevents any wear of the mane, and leaves the shoulders perfectly free, so as to give the horse more freedom of action.

The neck-strap is stiffened at each end by means of a metal band, $a$, inclosed therein, which causes it to retain its shape properly, leaving the center flexible; and, if desired, it may be connected with the check-rein hook of the saddle by a short strap, D, to prevent the neck-strap being thrown forward by the horse lowering its neck.

I am aware that curved straps have been used in harness as breast-collars, and hence lay no broad claim thereto; but

What I claim as new, and desire to secure by Letters Patent, is—

1. The improved curved neck-strap B, constructed substantially as shown and described, and adapted to be applied to a breast-collar, for the purposes set forth.

2. A neck-strap cut in a curved form rearwardly, so as to come behind the shoulders and mane of the horse, and provided with side stiffening-pieces, leaving the center flexible, substantially as and for the purposes set forth.

In testimony that I claim the above I have hereunto subscribed my name in the presence of two witnesses.

JAMES H. NICHOLS.

Witnessses:
JOHN F. BLACKMAR,
C. H. McEWEN.